United States Patent [19]

Hughes

[11] 4,424,194

[45] Jan. 3, 1984

[54] PROCESS FOR EXTRACTION OF METALS FROM LEACHABLE ORES AND FORMING OF BUILDING MATERIALS

[76] Inventor: Robert M. Hughes, 10039 Bristol, Alta Loma, Calif. 91701

[21] Appl. No.: 336,693

[22] Filed: Jan. 4, 1982

[51] Int. Cl.³ .......................... C01G 1/00; C01G 5/00; C01G 7/00; E04B 5/04

[52] U.S. Cl. ............................................ 423/1; 423/27; 423/29; 423/658.5; 75/3; 52/606; 106/107; 106/110; 501/155

[58] Field of Search ..................... 423/1, 27, 29, 658.5; 75/3; 52/606; 106/107, 110; 501/155

[56] References Cited

U.S. PATENT DOCUMENTS

| | | | |
|---|---|---|---|
| 588,476 | 8/1897 | Rhodes | 423/27 |
| 1,907,170 | 5/1933 | Ahearn | 52/606 |
| 3,856,927 | 12/1974 | Silveston et al. | 423/533 |
| 3,985,567 | 10/1976 | Iwu | 423/111 |
| 4,256,706 | 3/1981 | Heinen | 423/29 |
| 4,279,868 | 7/1981 | von Kohorn | 423/27 |

FOREIGN PATENT DOCUMENTS 975927 10/1975 Canada .............................. 423/522

Primary Examiner—Herbert T. Carter
Attorney, Agent, or Firm—Boniard I. Brown

[57] ABSTRACT

The method for extraction of precious metals from leachable ores and forming a building materials which includes the steps of crushing a quantity of leachable ore into a powder of substantially uniform particle size, mixing with a quantity of a binding material and mixing with a leaching material. The materials are then formed into a masonry building construction article having at least one passage therein. A plurality of the masonry building construction articles are stacked with at least some of the passages disposed therein in generally parallel flow paths and a solvent is passed through the passages of the masonry building construction articles.

11 Claims, 11 Drawing Figures

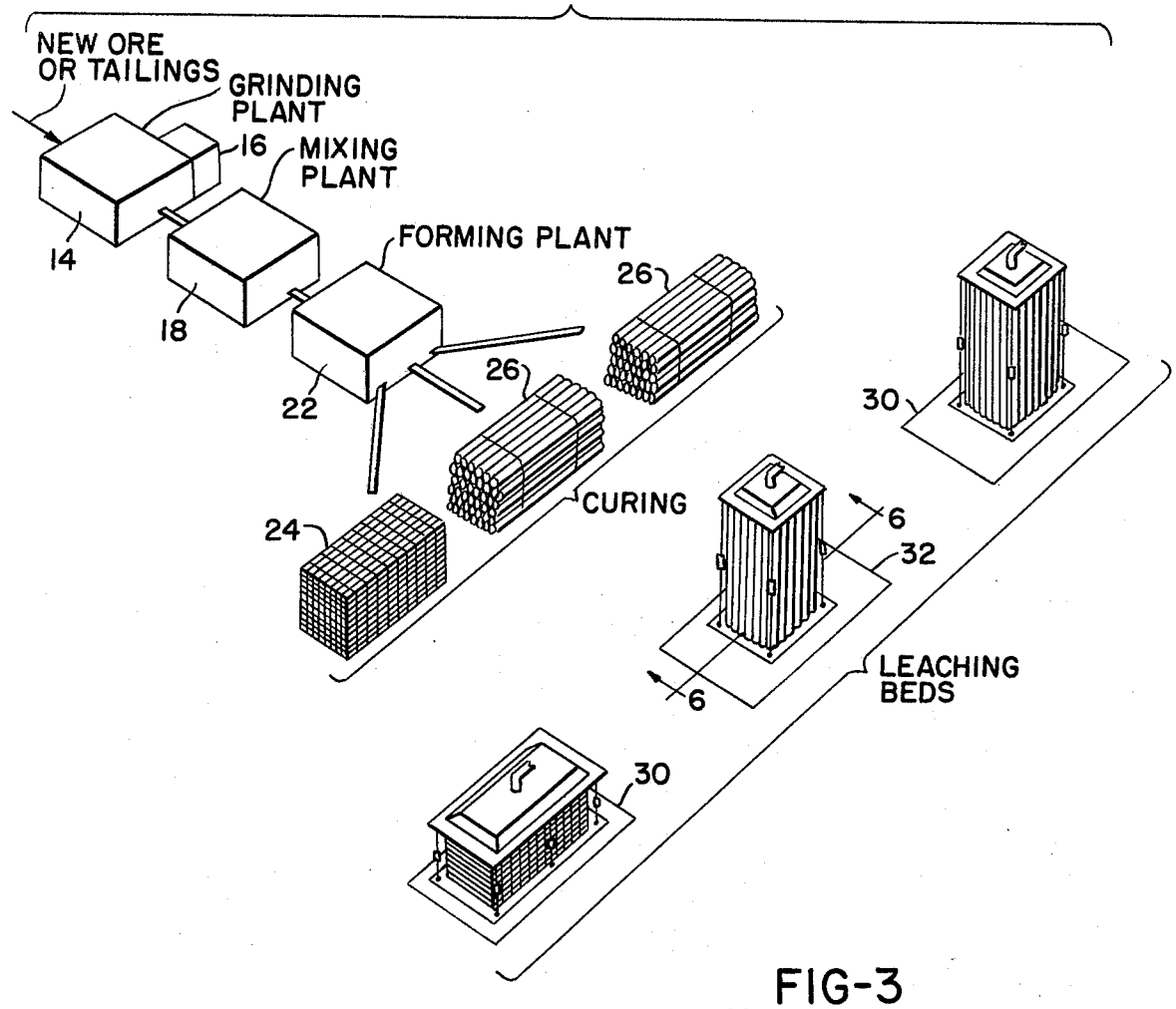
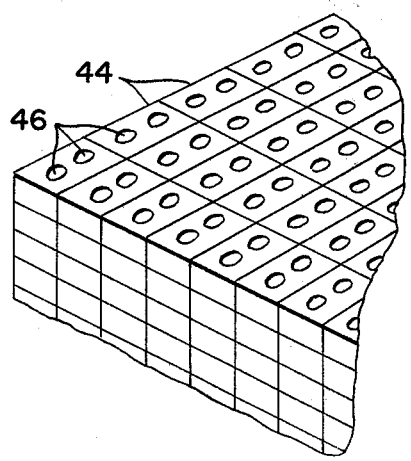
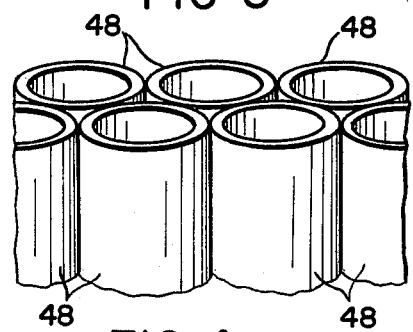
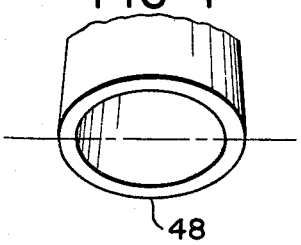

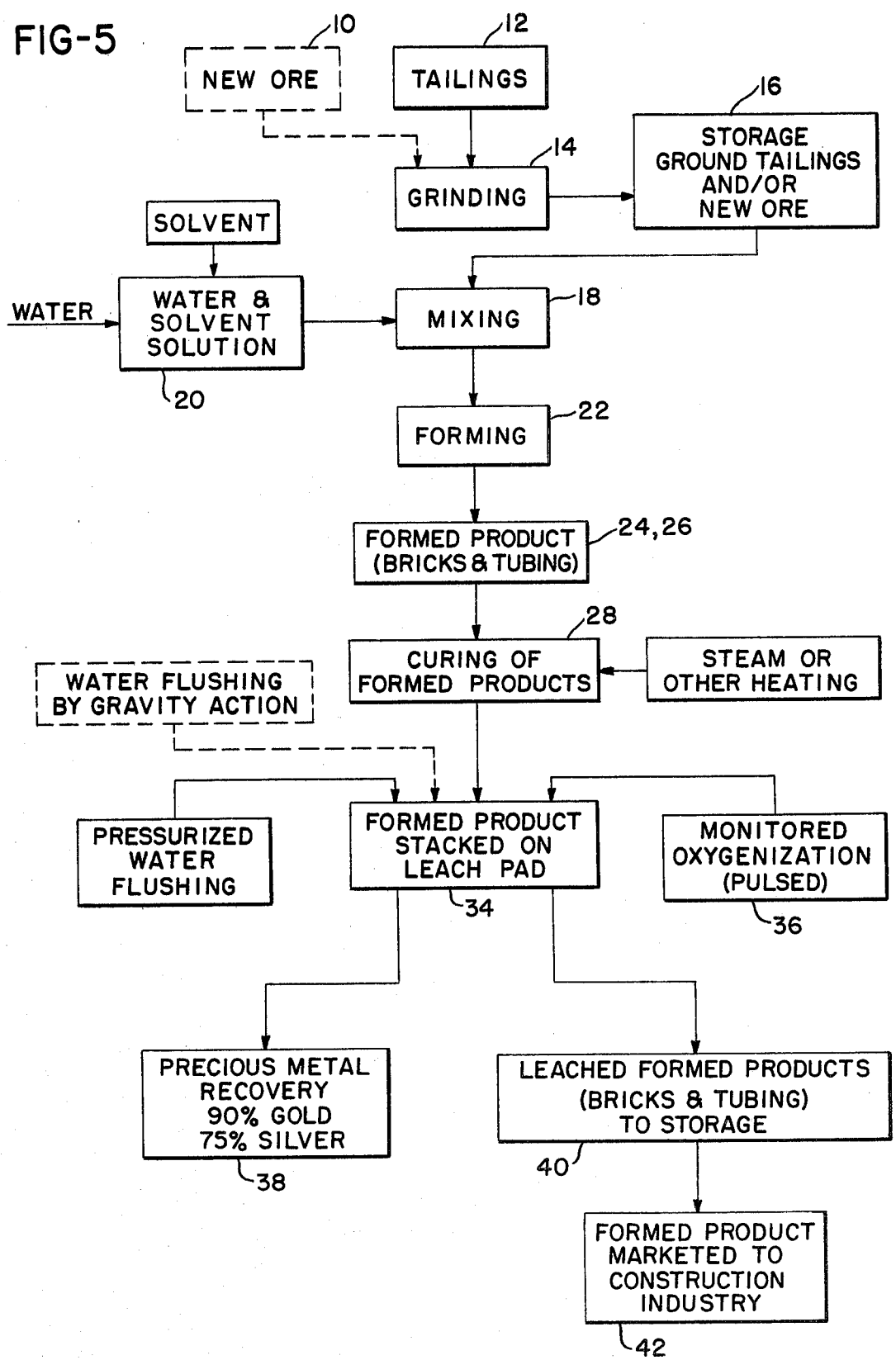

PROCESS FOR EXTRACTION OF METALS FROM LEACHABLE ORES AND FORMING OF BUILDING MATERIALS

BACKGROUND OF THE INVENTION

This invention relates to the treatment of "ore" (i.e., any leachable material) for the purpose of extracting metals in general and more particularly to the exposure of ore to a leaching solution during a cyanidization metal extraction process. This invention also relates to a process which includes the steps of forming the ore bodies into building construction products or decorative articles and materials. Many metals, particularly precious metals, are found in ore or mine dump tailing piles or in sewage treated at sewage plants and must be extracted to be utilized. The most common methods of extracting precious metals, such as gold and silver, from ores are generally referred to as the cyanidization or leaching processes. These processes are carried out by up flow, down flow and percolation of the leaching solution through the ore.

The prior art includes U.S. Pat. No. 4,190,436 which issued to the present applicant on Feb. 26, 1980. This patent relates to air mix agitation for the extraction of metals from leachable ores.

It is an object of the invention to provide a process which is economically advantageous as compared to processes which have been generally used heretofore.

It is another object of the invention to provide a process having application both to tailings of abandoned mines, which have been previously deemed to be uneconomic to mine, as well to ores having substantial deposits of relatively precious metals.

Still another object of the invention is to provide a process which is cost effective enough to use with low grade ores that have not been previously utilized because the extraction was not economically practical with the prior art methods.

SUMMARY OF THE INVENTION

The foregoing objects and other objects and advantages which shall become apparent from the detailed description of the preferred embodiment are attained in a method which includes the steps of crushing a quantity of leachable ore into a powder of substantially uniform particle size; mixing with a quantity of a binding material; mixing with a leaching material; and forming into a masonry building construction article having at least one passage therein. Thereafter, a plurality of the masonry building construction articles are stacked with at least some of the passages disposed therein in generally parallel flow paths and a solvent is passed through the passages of the masonry building construction articles.

In some forms of the invention the stacking step may include orienting parallel arrays of articles with passage in each array disposed in registered relationship. The masonry construction article may be a brick, a cylindrical member, or other body. The method may further include the step of splitting each of the cylindrical members along a plane extending through the geometric axis of the cylindrical object to form spanish tile.

In some forms of the invention the flow paths may be generally vertical, in other forms flow paths may be generally horizontal.

The binding agent may be cement or lime.

BRIEF DESCRIPTION OF THE ACCOMPANYING DRAWING

FIG. 1 is a schematic view illustrating broadly the sequential steps in one form of the process in accordance with the invention;

FIG. 2 is a partial perspective view of a plurality of bricks which have been stacked with openings disposed therein in registered relationship as is desirable in the leaching step in accordance with the invention;

FIG. 3 is a perspective view of a plurality of tubular building construction articles arrayed for the flushing step;

FIG. 4 is a partial perspective view of a single tubular member illustrating the line about which the tubular member must be split to form spanish tile;

FIG. 5 is a flow chart illustrating the sequential steps in accordance with one form of the process in accordance with the invention;

DESCRIPTION OF THE PREFERRED EMBODIMENT

Figure 6:
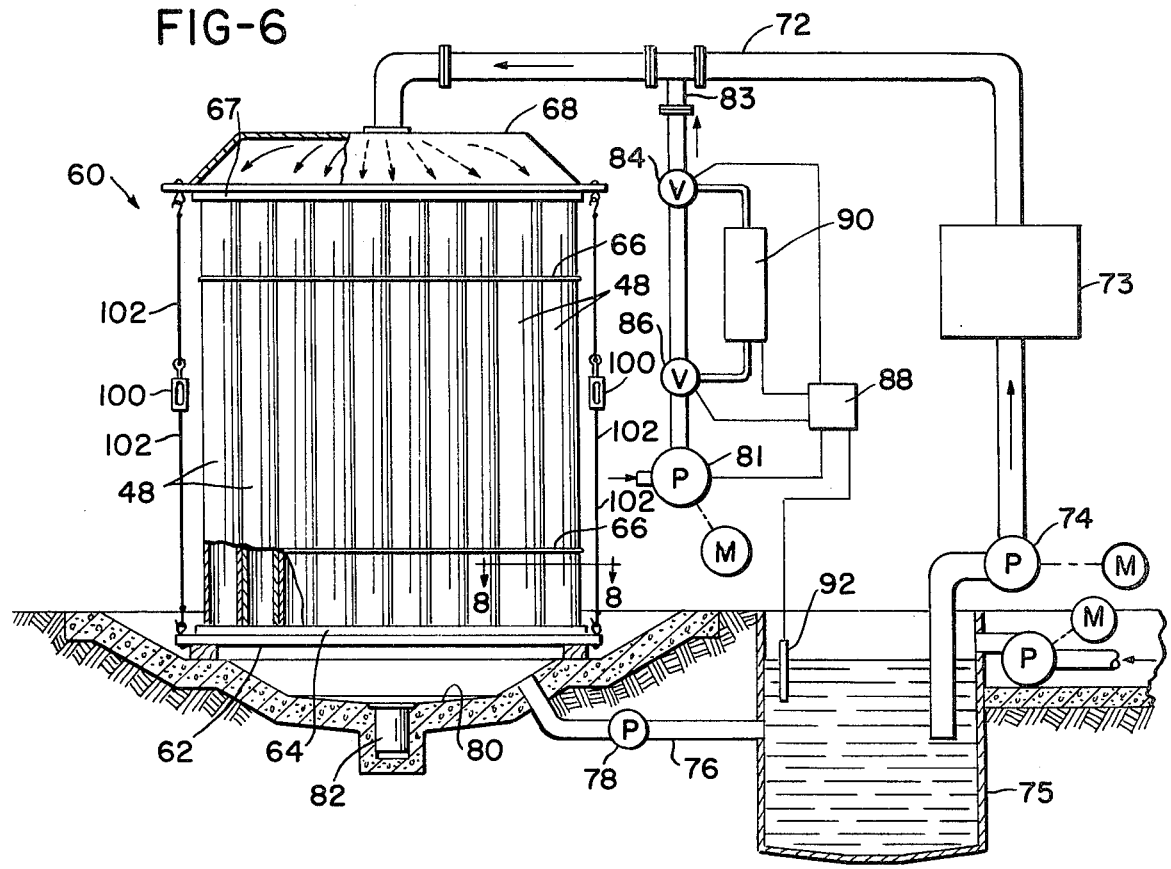
FIG. 6 is a partially schematic elevational view of apparatus which may be used to practice the process in accordance with the invention.

The present invention relates primarily to percolation leaching. Such processes have been described in a publication of the Bureau of Mines of the United States Department of the Interior entitled Enhancing Percolation Rates and Heap Leaching of Gold-Silver Ores by H. A. Heinen, G. E. McClelland and R. E. Lindstrom. The McClelland system involves agglomeration of fines and larger chunks or globs of ore in a heap leaching process.

Additional background information is provided by a paper entitled "Some Factors in the Design of Heap Leaching Operations" by George M. Potter, which was presented at the precious metals symposium of the northern Nevada section of SME-AIME in cooperation with the Nevada Bureau of Mines and Geology and the Nevada Division of Mineral Resources on Nov. 17, 1980.

The present invention differs substantially from the procedures described in these background documents in that the ore is initially ground up and formed into bodies which will alternately be used in place of conventionally formed bricks, concrete blocks, spanish tile and the like. The invention may be used with either freshly mined ore or with tailings, which are the discarded material from which metals have been previously extracted. Such materials are commonly found around mines which have been operated many years ago. A substantial portion of the metal has not been removed from the ore or tailings because with processes generally known, prior to this time, such extraction was not economically feasible. The invention makes it cost effective to leach such lower grade ore or tailings because marketable bricks, roofing tile, etc. are produced as by-products.

Referring first to FIGS. 1 and 5, new ore 10 or tailings 12 are moved to a grinding plant 14 where they are ground to a substantially uniform size. The ground material may be either stored in a storage location 16 or moved directly to a mixing plant 18, where a water and cyanide, or other solution 20 is added.

Thereafter the material is moved to a forming plant 22 wherein the ground ore 10 or tailings 12, are formed into bricks 24, spanish tile 26, or other similar objects such as blocks similar to conventional concrete blocks. The specific manner of forming and the specific geometric shapes will be described hereafter. After the forming step the articles are allowed to cure for approximately ten days in the step identified in FIG. 5 by the numeral 28. It will be understood that the leaching solution will continue to react with the ore during the curing of the objects. The speed of curing may be accelerated by the application of heat. Steam has been found to be particularly suitable for this purpose. The curing step may take approximately ten days. With the use of heat the curing step may take twenty hours or, at least in some cases, even less.

Thereafter the objects are moved to leaching beds 30, 32 at which flushing by either pressurized water or water passing under the influence of gravity is directed through the formed product. Alternatively, the leaching solution may be circulated through the formed product before stacking is initiated. This step is identified by the numeral 34 in FIG. 5. The heating of the solution may reduce the time required. Oxygen may be pulsed through the stack during this step as indicated by the block identified by the numeral 36. The manner of oxygenation will be ordinarily in accordance with the procedures described in the above referred to U.S. Pat. No. 4,190,436. The precious metals 38 and the formed products 40 are then marketed. The products 40 are marketed to the construction industry as indicated by the block 42 in FIG. 5.

Referring particularly now to FIGS. 2, 3, 4 and 8, a variety of possible geometric objects or products 40 may be formed in the step identified by the numeral 22 in FIGS. 1 and 5. The objects may include bricks 44, illustrated in FIG. 2, which desirably are provided with holes 46 in standardized locations. This arrangement permits the stacked array of bricks 44, illustrated in FIG. 2, in which the holes 46 of a plurality of the bricks 44 within the array are disposed in registered relationship. As described above, this relationship is desirable so as to permit the flushing by either pressurized water or water passing under the influence of gravity through the formed product at the leaching beds 30, 32 in the step identified by the numeral 34 in FIG. 5.

Figure 8:
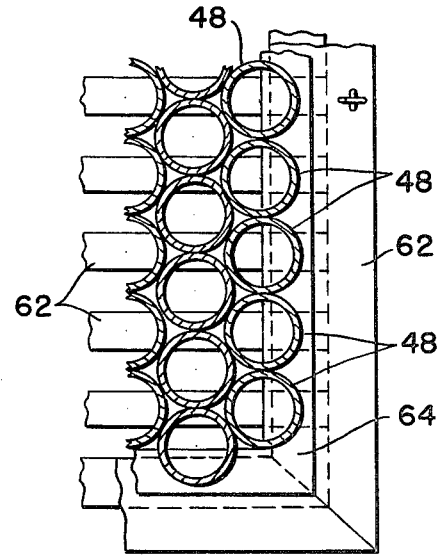
FIG. 8 is a sectional view taken along the line 8—8 of FIG. 6.

As illustrated in FIGS. 3, 4 and 8, the formed objects may be a plurality of cylindrical bodies 48. The cylindrical bodies 48 may be ultimately utilized in the form illustrated in FIG. 3. Alternatively, they may be split along a plane extending through the geometric center line of the cylindrical objects 48, as best illustrated in FIG. 4. This splitting step, when performed on a suitably dimensioned cylindrical body 48, will result in the formation of spanish tile for roofing construction.

With this background the details of the process in accordance with the invention will be described in greater detail. The manner of forming the masonry building article may be according to any of various known methods. Among these are the stiff-mud, soft-mud, and dry-press processes. Each process requires slightly different molding equipment and treatment in mixing. The ore must be ground and mixed to the proper consistency for molding and the correct amount of water added. It will be understood that the ore will be mixed with a binding material such as cement or lime in accordance with the procedures described generally in the above referred to publication by Heinen, McClelland and Lindstrom. The term cement, as used herein, will be understood to mean portland cement (and the like) such as is commonly used in the manufacture of concrete. The exact proportions of materials will vary with the object being molded and the specific process being utilized, as well as the quality of the ore utilized. Commonly, the cement will be 9 to 10% of the mix and the remainder will be aggregate and ore in amounts which vary depending on the desired texture. In the stiff-mud process of forming and molding, the mix is delivered to an auger machine which forces the plastic mass through a die in a continuous stream or column. The die molds the mass into the desired shape for brick and as the column is extruded, it passes through a machine which cuts it into the desired lengths. In the soft-mud process, machines press the mix into forms rather than extrude it from a die. The final results are the same as in the stiff-mud process. The dry-press process permits the use of more or less nonplastic and relatively dry clays. The mix is put into molds and subjected to pressure of from 550 to 1500 pounds per square inch.

The wet molded shapes (called "green brick") as they come from the cutting or molding machines contain from 7 to 30 percent moisture, depending upon the forming process. In order to assure strength and uniformity, most of this water is evaporated. This process may be accomplished in drying kilns at temperatures of 100 to 400 degrees. Drying time varies from 24 to 48 hours according to the amount of moisture to be evaporated. The process must not be too rapid.

Conventional brick making techniques utililze a burning step. A burning step may be utilized in the present invention although it will often be omitted. In this step it is essential to distribute heat evenly in order to produce bricks or other forms of products which have substantially uniform hardness and strength. Modern burning kilns, fired by natural gas or oil, however, allow for even distribution of heat, assuring even quality brick throughout each batch. The main types of kilns used today are the periodic and tunnel kilns. In each type, the molded and dried units are stacked in such a way that the heat may circulate freely around each unit. In the periodic kilns, the bricks remain stationary while the temperature is changed for each stage of burning. In the tunnel kiln, the bricks are on moving cars which pass through different temperature zones. The burning process requires from as little as 40 hours in tunnel kilns, or up to as much as 150 hours in periodic kilns. Again, the time required will vary according to the molding process employed. The bricks are cooled gradually in the kiln. If the bricks are cooled too rapidly, cracking and checking of the surfaces may occur.

One curing method that is advantageous is the Johnson direct-fired steam curing system marketed by the Johnson Gas Appliance Company of Cedar Rapids, Iowa. The system includes equipment providing a steaming cycle, a drying and carbonation cycle and a vending cycle.

Objects similar to conventional concrete blocks should be fabricated with known processes. Such processes often include feeding raw materials into a molding machine which employs vibrating and tamping actions. The molding machines are automatically regulated to control the density and texture of the units. There is only enough water in the mixture to make it fluid enough to feed into the machines, and so that the units will hold their shape when taken from the molds.

The method used for curing concrete blocks, formerly, was to store the freshly molded units (called green units) so that they were exposed to normal atmospheric conditions until thoroughly cured. This usually took about 28 days. The development of modern technological methods, using heated air and steam, revolutionized concrete block manufacture by greatly reducing the time of curing from several days down to a matter of hours. Unlike clay brick units, concrete blocks must be cured in the presence of moisture. If the green units are subjected to hot dry air, they will lose moisture too rapidly, causing excessive shrinkage and cracking. These units will be weak and brittle and generally unfit for almost any kind of construction. The principal methods are low pressure steam curing and high pressure steam curing.

A leaching solution which is commonly used is either a potassium cyanide or sodium cyanide solution. Other leaching solutions may also be used. The material for the articles which are formed customarily includes cyanide, which has been added to water. Also included in the articles or bodies is lime or cement, aggregate, and new ore and/or or tailings. The solution of cyanide in water preferably will ordinarily be a 10% solution. It will be understood that this 10% solution is about forty times more concentrated than cyanide concentrations commonly used. More specifically, commonly used concentrations are 0.25% to 0.05% in conventional leaching processes.

The flushing solution may be merely water or the commonly used 0.25% sodium cyanide solution.

Figure 7:
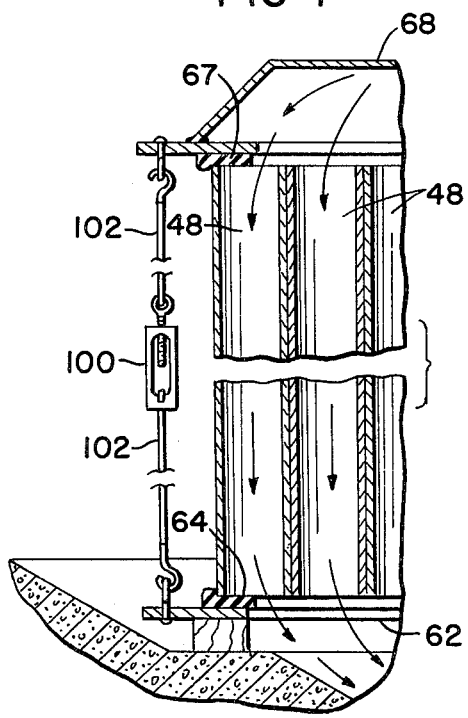
FIG. 7 is an enlarged partial perspective view of a portion of the apparatus illustrated in FIG. 6.

Referring particularly now to FIGS. 6, 7 and 8, there is shown apparatus 60 which is suitable for use during the pressurized water flushing step 30, or the monitored oxygenation step 36 may also be carried out while the formed product is left stacked on the leach pad in accordance with step 4. The apparatus 60 ordinarily includes a pallet 62 having a resilient seal 64 disposed along the face thereof. In some forms of the invention the resilient seal 64 may merely extend along the peripheral edge of the pallet 62, as illustrated in FIG. 7. Means must be provided for passage of the various fluids through the cylindrical objects 48. The cylindrical objects 48 ordinarily will be secured in a bundled array by tie cables 66 or an automatic hydraulic pressure type lid. An inlet hood 68 is positioned at the top of the cylindrical objects 48 with a resilient seal 67 disposed intermediate at least the peripheral portions of the array of cylindrical objects 48. Turnbuckles 100 and cables 102 extend intermediate the inlet hood 68 and the pallet 62 to maintain the seals 64, 67 in substantially fluid tight relationship. Connected to the inlet hood 68 is a conduit 72 extending from a pump 74 which draws a leaching solution from a storage tank 75. An activated carbon column 73 is installed in the conduit 72 to absorb precious metals, and the like. The tank 75 is connected via a conduit 76 and a second pump 78 to the concave leaching pad 80 disposed underneath the pallet 62. The leaching pad 80 is provided with a slime trap 82. The leaching pad 80 will typically be of asphalt construction.

Air is provided to the inlet hood 68 via a pump or blower 81 that is connected to a tee connection 83 in the conduit 72 by a series of valves 84 and 86 and/or process control devices 88, 90, and 92 at a flow rate sufficient to create a sufficient air exit pressure from the distributor. This pressure of course will vary according to the requirements of the present system.

When the air is introduced by a timed or controlled burst, an action is produced which causes the water or other solvent to become dispersed throughout the masonry products to remove the cyanide or other leaching solution in an efficient manner.

When the leaching process has been completed, the container or slime trap 82 is removed from the bottom of the leaching pad 80 to permit removal of the gangue or mud (ore that no longer has precious metals contained therein) from the bottom of the container 82.

Figure 9:
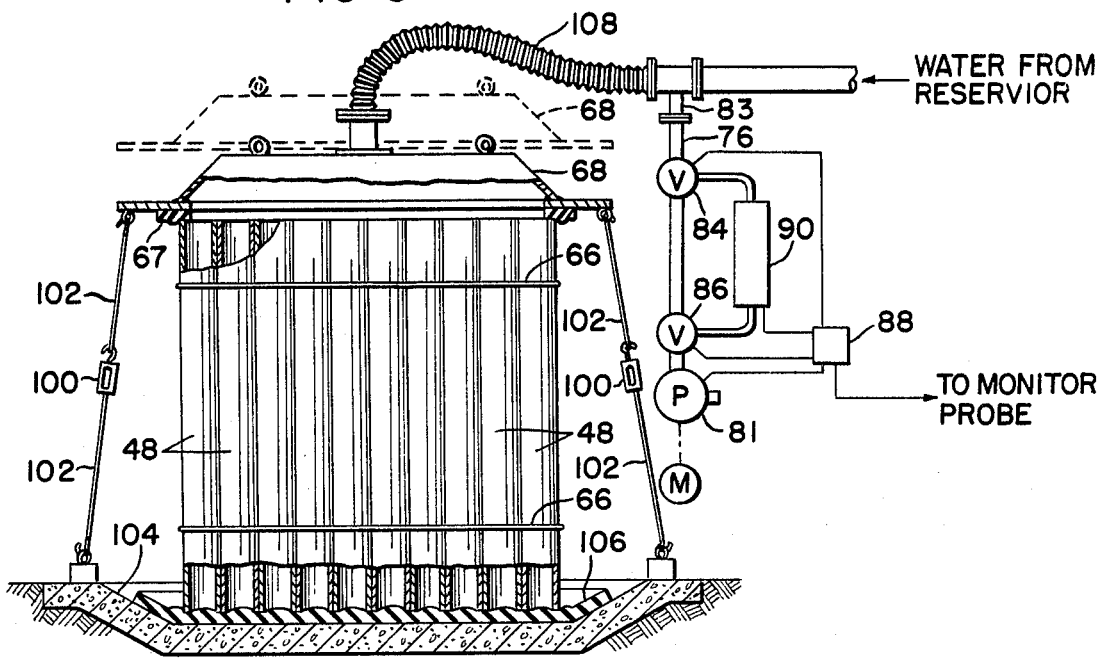
FIG. 9 is a view similar to that of FIG. 6, which illustrates apparatus for practicing an alternate form of the process in accordance with the invention.

Referring now to FIG. 9, there is shown an apparatus similar to that illustrated in FIG. 6, in which a plurality of cylindrical bodies 48 are secured by tie cables 66 intermediate an inlet hood 68 which is movable between positions engaged with the array of cylindrical bodies 48 and away from the array of cylindrical bodies 48. An asphalt or concrete leaching pad 104 is provided with a resilient bottom seal pad 106 which cooperates with the lower extremity of the cylindrical bodies 48. In a similar manner the seal 67 cooperates with the upper axial extremities of the cylindrical bodies 48. In a manner similar to the apparatus of FIG. 6, a conduit 108 is provided for passing water together with bursts of air via the tee 83. The conduit 108 will be seen to have an axial section, which is flexible, to facilitate the movement of the inlet hood 68 between the illustrated positions. The pump 81 is connected to the tee 83 via the conduit 76 and valves 84, 86 and/or process control devices 88, 90. The process control 88 may be connected to an oxygen monitor probe (not shown) such as 92, illustrated in FIG. 6, which will monitor the oxygen in the water passing from the leaching pad 104.

Figure 10:
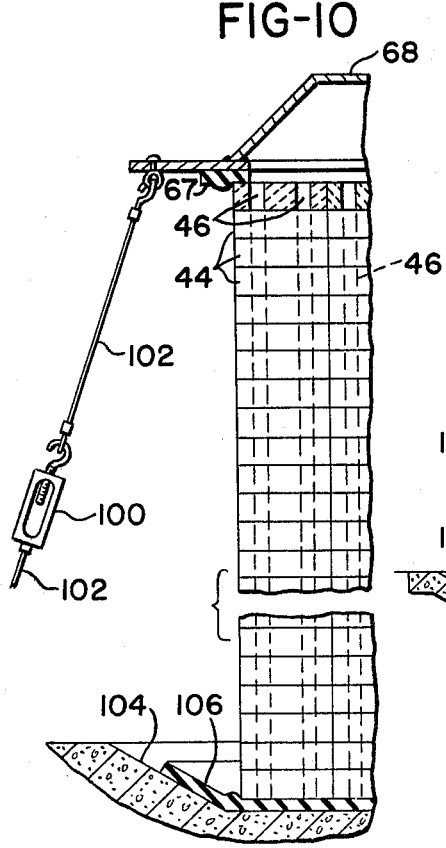
FIG. 10 is a partial elevational view, to enlarged scale, of stacks of bricks having holes disposed in registered relationship disposed in apparatus similar to that shown in FIGS. 6 and 9.

FIG. 10 illustrates, in greater detail, the manner of cooperation of a stack of bricks 44 which are stacked with holes 46 in registered relationship. In other respects the arrangement is substantially the same as that illustrated in FIG. 9.

Figure 11:
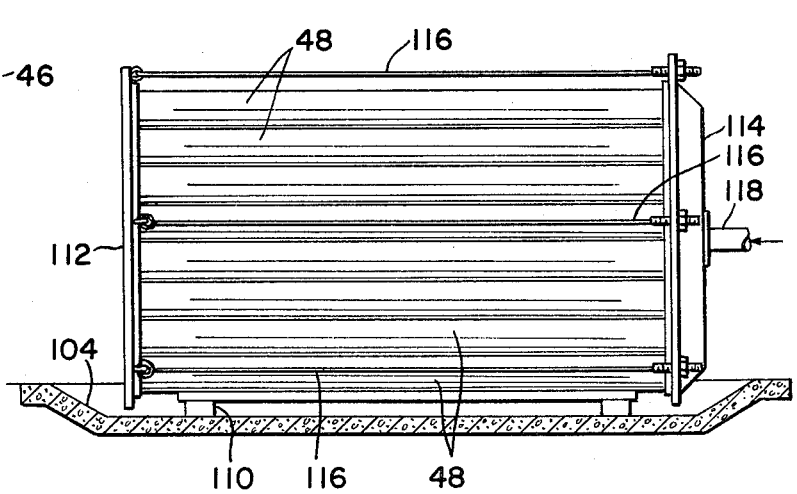
FIG. 11 is an elevational view in partial section of apparatus for horizontal leaching in accordance with one form of the process, in accordance with the invention.

Referring to FIG. 11, there is shown apparatus for horizontal flushing of the apparatus. Although only cylindrical members 48 have been illustrated, it will be understood that such flushing may be conducted on other geometric forms. The apparatus illustrated includes a leaching pad 104, a pallet 110 and end sealing plates 112, 114 which are connected by tension cables 116. A connector 118 is provided in the end sealing plates 114 to allow passage of the water or flushing medium. Although not illustrated, means may be provided in the end sealing plate 112 for collecting the water or other flushing medium.

The articles or bodies are subjected to water flushing for an appropriate period, which may vary from a few hours to a number of days depending in part on the flushing solution utilized, use of heat and other factors. For gold, 90% of the gold is reacted or removed in approximately five days of outside curing. For silver, approximately 75% of the silver is reacted on and taken out in approximately ten days of outside curing. If the apparatus illustrated in FIG. 6 or 10 is utilized, the pressure induced flow decreases the time for the reaction from five days for gold and ten days for silver to twenty four hours or less for both gold and silver. The water pressure forces tend to force the water out laterally through the porous material instead of merely seeping out under the action of gravity.

Although the invention has been described with respect to FIGS. 6 and 9 in terms of a pressurized flow of solvent, such as water, to direct the flow of the solvent, such as water, through the articles, it will be understood that pressurizing is not essential and the stack of articles or even individual articles may be merely filled up with solution, and the solution allowed to leak through the walls thereof due to the action of gravity. The invention is advantageous, in part, because it results in a much cleaner pregnant leaching solution as compared to other leaching methods and thus eliminates the need for extensive filtering of the solution.

The invention also makes it cost effective to leach lower grade ores then those customarily considered, because of the revenues received from the sale of the bricks or other formed bodies which are sold. The formed bodies, after the leaching process is completed, are sold for use as bricks, spanish tiles for roofing use, hollow tubing and other similar construction articles. In addition the invention may also be used to form decorative articles. Thus, the term construction article will be understood to include such decorative articles. The income from the sale of the formed bodies offsets part of the costs of the leaching process.

The apparatus in accordance with the invention is also applicable to various blocks which are commonly referred to as "cinder blocks" and "concrete blocks" including those identified by the terms used in the trade which include: stretcher block, corner block, double corner or pier block, bullnose block, wood sash jamb block, header block, solid top block, metal sash block, partition block, beam linted block.

The invention has been described with reference to its illustrated preferred embodiment. Persons skilled in the art may, upon exposure to the teachings herein, conceive variations in the process. The leaching material may for example be a cyanide solution or other solvent. Such variations are deemed to be encompassed by the disclosure, the invention being delimited only by the appended claims.

The inventor claims:

1. The method which comprises the steps of:
   crushing a quantity of leachable ore into a powder of substantially uniform particle size;
   mixing with a quantity of a binding material;
   mixing with a leaching material;
   forming into a masonry building construction article having at least one passage therein such that the quantity of the binding material is sufficient to impart adequate structural strength to the article;
   stacking a plurality of said masonry building construction articles with at least some of said passages disposed therein in generally parallel flow paths;
   passing a solvent through the passages of the masonry building construction articles to extract and recover metal values from the ore and thereafter recovering the by-product formed construction articles.

2. The method as described in claim 1, wherein: said stacking step includes orienting parallel arrays of articles with passages in each array disposed in registered relationship.

3. The method as described in claim 2, wherein: said masonry construction article is a brick.

4. The method as described in claim 2, wherein: said masonry construction article is a cylindrical member.

5. The method as described in claim 4, wherein: said method further includes the step of splitting said cylindrical member along a plane extending through the geometric axis of said cylindrical object to form spanish tile.

6. The method as described in claim 1, 2, 3, 4 or 5, wherein: said flow paths are generally vertical.

7. The method as described in claim 1, 2, 3, 4 or 5, wherein: said flow paths are generally horizontal.

8. The method as described in claims 1, 2, 3, 4 or 5, wherein: said binding agent is cement.

9. The method as described in claims 1, 2, 3, 4 or 5, wherein: said binding agent is lime.

10. The method as described in claim 1, wherein: the quantity of the binding material which comprises cement is about 9 to 10 weight percent.

11. The method as described in claim 1, wherein: said method includes, after the forming step, heating the plurality of said masonry building construction particles such that the rate of curing is accelerated.

* * * * *